United States Patent
Labuto

(10) Patent No.: US 10,829,375 B2
(45) Date of Patent: Nov. 10, 2020

(54) PROCESS FOR TREATING MATERIAL WITH SULFURIC ACID AND MATERIALS OBTAINED THEREBY

(71) Applicant: César Augusto Dumont Labuto, Rio de Janeiro (BR)

(72) Inventor: César Augusto Dumont Labuto, Rio de Janeiro (BR)

( * ) Notice: Subject to any disclaimer, the term of this patent is extended or adjusted under 35 U.S.C. 154(b) by 470 days.

(21) Appl. No.: 15/103,733

(22) PCT Filed: Dec. 10, 2014

(86) PCT No.: PCT/BR2014/000432
§ 371 (c)(1),
(2) Date: Sep. 26, 2016

(87) PCT Pub. No.: WO2015/085382
PCT Pub. Date: Jun. 18, 2015

(65) Prior Publication Data
US 2017/0008764 A1    Jan. 12, 2017

(30) Foreign Application Priority Data
Dec. 10, 2013 (BR) .............. 102013031788

(51) Int. Cl.
*C01B 17/69* (2006.01)
*C09K 21/02* (2006.01)
*C09K 15/02* (2006.01)

(52) U.S. Cl.
CPC .......... *C01B 17/69* (2013.01); *C09K 15/02* (2013.01); *C09K 21/02* (2013.01)

(58) Field of Classification Search
None
See application file for complete search history.

(56) References Cited

U.S. PATENT DOCUMENTS

| | | | | |
|---|---|---|---|---|
| 1,360,224 A * | 11/1920 | Kashitani | ............... | D06M 11/38 8/115.6 |
| 1,855,203 A * | 4/1932 | Robinson | ............... | C10G 17/06 208/270 |
| 1,968,223 A * | 7/1934 | Rosen | ............... | D21C 9/083 162/82 |
| 2,238,896 A * | 4/1941 | Gibbons | ............... | C01B 7/017 210/683 |
| 2,328,166 A * | 8/1943 | Polgar | ............... | G03C 7/02 430/339 |
| 2,430,673 A * | 11/1947 | Gibson | ............... | C07C 2/62 516/DIG. 6 |
| 2,432,153 A * | 12/1947 | Haney | ............... | C08B 3/22 536/65 |
| 2,614,922 A * | 10/1952 | Hope | ............... | D21C 5/02 162/5 |
| 2,663,907 A * | 12/1953 | Downing | ............... | C08B 1/00 241/17 |
| 2,714,591 A * | 8/1955 | Klug | ............... | C08B 5/14 536/59 |
| 2,939,813 A * | 6/1960 | Wayman | ............... | D21C 3/003 162/78 |
| 3,000,876 A * | 9/1961 | Touey | ............... | C08B 7/00 106/200.3 |
| 3,008,888 A * | 11/1961 | Fujimoto | ............... | D21H 17/65 122/451 R |
| 3,057,852 A * | 10/1962 | Kiefer | ............... | C08B 7/00 536/59 |
| 3,135,613 A * | 6/1964 | Underwood | ............... | A22C 13/0013 138/118.1 |
| 3,357,874 A * | 12/1967 | Kennedy, Jr. | ............... | B32B 27/00 156/308.8 |
| 3,366,532 A * | 1/1968 | Maskey | ............... | B32B 27/00 428/292.7 |
| 3,457,234 A * | 7/1969 | Gianatasio | ............... | C08G 18/10 264/236 |
| 3,557,083 A * | 1/1971 | Sacco Bron | ............... | C08B 3/06 106/171.1 |
| 3,562,100 A * | 2/1971 | Wasko et al. | ............... | D21H 17/10 162/135 |
| 3,607,621 A * | 9/1971 | Wasko | ............... | D21H 17/53 162/135 |
| 4,039,645 A * | 8/1977 | Coyle | ............... | B27N 9/00 264/109 |
| 4,622,071 A * | 11/1986 | Matsuura | ............... | C04B 18/06 106/15.05 |

(Continued)

FOREIGN PATENT DOCUMENTS

WO    WO 2008/059530 A3 *  5/2008  ............... C09C 1/42

*Primary Examiner* — Joseph D Anthony
(74) *Attorney, Agent, or Firm* — Fleit Intellectual Property Law; Paul D. Bianco; Katharine Davis

(57) ABSTRACT

A process for the addition, incorporation, distribution and/or fixation of a portion of sulphuric acid to/in a "material of interest" which is intended to include or be provided with the improved properties, any starting materials, phases, layers, internal regions or surface thereof, in the natural state, before, during or after formation/production thereof (where applicable) or when already there (new, used or existing), preferably using a carrier, preferably water. Material resistance is achieved for matter, objects, fluids, products, substances and materials, and controlled synthesis of structures, incarbonization, heat impressions (following exposure to temperature and pressure variations, a situation that results in an increase in material hardness with carbon retention and heat impression in the area affected by heat) are enabled, resulting in products and use thereof.

20 Claims, No Drawings

(56) References Cited

U.S. PATENT DOCUMENTS

| | | | | |
|---|---|---|---|---|
| 6,057,438 A | * | 5/2000 | Hyatt | ............... C08B 37/0057 162/55 |
| 2010/0139877 A1 | * | 6/2010 | Black | ............... A22C 13/0003 162/146 |

* cited by examiner

PROCESS FOR TREATING MATERIAL WITH SULFURIC ACID AND MATERIALS OBTAINED THEREBY

The present invention relates to a process and products for material resistance (physical, chemical and biological) to temperature and pressure variations (natural, accidental or controlled), to heat and fire, to contagion, creation, consumption and propagation of these, to degradation of materials, to combustion, to pyrofagia, to volatilization, to gas emissions, to carbon release, to spark and to explosion, as well as to allow the controlled synthesis of structures, the increasing carbon content, thermal printing and its use. Resistance applies, not exhaustively, matter, bodies, fluids, products, substances and materials, whatever they may be, physical or biological, organic or not, existing or in production, combustible, oxidizing or not, hydrophobic, hydrophilic or not, homogeneous or not, dense, hollow, laminated or not, isotropic or not, solid, liquid or gaseous, which can be provided of resistance by the present invention. The present invention also relates to the controlled synthesis of structures, the increasing carbon content, the thermal printing and to its use. This is because, accomplished the first stage of the process, to provide resistance, can succeed it with a controlled exposure or not to the temperature and pressure variations, a situation that results in increased hardness with carbon storage and thermal printing of the area affected by the heat. Combining the temperature rise with increasing pressure, especially for levels, components and environments that reproduce existing in the hydrocarbon formation environment (especially kerogen, oil and natural gas), the synthesis may result in new carbon structures, including coal and new oil with the same or similar structure to the kerogen, oil and natural gas.

There is no parallel in the current state of the art.

By the present invention, pass to resist, directly, matter, bodies, fluids, products, substances and materials, including biomass, perimeters, land, forests, soils, substrates and buildings, made or provided with resistance by the present invention and, indirectly, all those who are preserved due to the resistance of these. The resistance obtained has applicability in material, human and environment preservation and is associated with properties that allow applications (industrial or not) related to thermal resistance and pressure, control or adjustment of this resistance, protection and combating the heat and the fire, the reduction of greenhouse gas emissions (including those related to the greenhouse effect, by the expressionless release of carbon gases when the heat exposure, accidental or provoked) and sterilization of explosive charges. The resistance obtained has applicability to exposure to heat variations, temperature and natural pressure, accidental or caused, including those associated with natural disasters, logistic processes or industrial applications, avoiding damage and enabling up new applications technical, logistics, energy and industrial in each case.

By the present invention, there is a process of addition, incorporation, distribution and/or fixation of a sulfuric acid content to a "material object", thus defined one that is intended to provide or providing the features of the present invention, on the natural state of "material object", before, during, after its creation/production (when applicable) or while it is ready (new, used or existing), preferably (in particular) using a vehicle, preferably (in particular) water. It is Included in the definition of "material object" the matter, body, fluid, product, substance or material that will be formed or provided with resistance by the present invention, whatever it is, physical or biological, organic or not, fuel, oxidizer or not, hydrophobic, hydrophilic or not, homogeneous or not, dense, hollow, laminated or not, solid, liquid or gaseous, preferably (particularly) biomass, perimeter, land, forest, soil, substrate or building, organic material, cellulosic (wood, stems, branches, leaves, cellulose, fiber, paper pulp, cellulose paste, cellulose pulp, cellulose gum, wood pulp, paper pulp, paper, fiber, powder, bran, wood chips, bark or vegetable chips, among others), mineral, rock, sand, soil and clay, construction, waterproofing or paving element, vegetable, animal, mineral, synthetic or mixed fiber, yarn, fabric, mesh, weft, felt, blanket or layer, fluid, liquid, polymer, gel, paste, wax, mass or texture, foam, resin, emulsion, capsule, pouch, membrane, filter, touch, vehicle as well as the inputs and phases, layers, interiors or surfaces of these and any other materials, organic or inorganic, such as stems, branches, leaves and plant remains, even if dried, dehydrated or in degradation.

What is done is to provide matter, bodies, fluids, products, substances and materials or inputs, phases, layers, interiors or surfaces of these and any other materials, including biomass, perimeters, land, forests, soils, substrates and buildings, of a sulfuric acid content, preferably from 0.1% to 10%, more preferably from 0.5% to 5%, preferably added by aqueous vehicle, equivalently to permeation of the "material object" through sulfuric acid diluted in water preferably at a concentration of 1% to 10%, preferably under normal temperature and pressure conditions. The temperature and pressure conditions, the content and the incorporation mode can vary and be set experimentally depending on the physicochemical characteristics of each "material object", such as weight, density and permeability, on the environment in which it is, on the desired resistance level and on the desired type of structure to have after the casual or deliberate contact with heat. Note that, strictly speaking, there is not lower and upper limit for the content to be used, since, on one side, although a possible lower limit is not reached, some resistance is conferred, even occasionally or partial and, on the other hand, even a possible upper limit is exceeded, for example, exceeding the saturation point of a mixture, the excess of sulfuric acid can be configured as reserved stock. At the same step, even if the permeability of the "material object" is small, the present invention can be made, since sulfuric acid can be fixed thereto, as well as any of its inputs, phases, layers, interior or surfaces. Thus, it is evident that the sulfuric acid use can be made even in the event of absence of minimum and maximum values, failure or saturation, although respect for points of failure or saturation are valid references to be used. It is evident also that there is the additional possibility of using existing procedures in the art or manufacturing process of any product.

The way, the measurement and the amount of addition, embedding, distribution and/or fixing a sulfuric acid concentration may vary, but should preferably correspond to the reference of process indicated in this document, so that the content and the final amount of sulfuric acid present, embedded, distributed and/or fixed in the composition of the "material object" are equivalent (or keep referential correspondence) to those that would exist if the "material object", even if it was a final product, had been exposed to permeation by sulfuric acid in aqueous medium and drying (this, if applicable or desirable). Taking as an example a sheet of paper, cellulose, wood pulp or wood that is desired to be in resistance, the amount of sulfuric acid present in the final composition (having sulfuric acid introduced during manufacture/formation or after it) must be equivalent to what would have on a sheet of paper, cellulose, wood pulp or wood like already ready that was subjected to permeation of sulfuric acid in aqueous medium and then dried (this applies if or desirable).

Permeation by sulfuric acid in an aqueous medium is a reference and is also characterized by being a preferred mode of the present invention, there are, however, great flexibility in the employment process. In the process characterized, may be used vehicles other than water (such as gel mixture, preferably aqueous, mineral, rock, sand, land and/or clay, other solvents and powders, among others), to use other states of matter (solid, liquid and gas), varying the suggested concentrations of sulfuric acid, change the conditions of temperature and pressure and heat exposure time, especially for purposeful synthesis of structures, choose any stage of manufacturing/constitution of the "material object" in which the process will be applied, the manner and extent of incorporation of sulfuric acid to the material object. One can opt for sealing, isolating, modulating plasticity and/or waterproofing one or more layers, phases, interior or surface of the "material object", in order to avoid loss of which was added to the "material object," which could result in addition disproportion as well as contaminating the environment. The exact amount of sulfuric acid to be added for each "material object" can be adjusted experimentally, based on primary reference and be adjusted for, among other reasons, compensating different densities and permeabilities of the materials, any losses during the manufacture of the material or that would be due to the passage of time or environment exposure. This flexibility improves also its natural, industrial and postindustrial applicability by the technical, logistical and economical points of view.

An example of the flexibility to apply the process applies to the matter, bodies, fluids, products, substances and materials that during its production/incorporation already undergo stages or steps of production/incorporation, with or without the presence of sulfuric acid, which can be utilized (such as washing steps, rinsing and/or drying). During manufacture of cellulose pulp, for example, there are usable steps, which allows application of the process of the present invention, in this case, without the need to mount a new infrastructure support. For matter, bodies, fluids, products, substances and materials that already have contact with sulfuric acid, one option is to make use of sulfuric acid in such a way and to such an extent that, after this contact, the final content of sulfuric acid in "material object" is the one stated in the process.

For existing materials, even if they do not result from industrial processes, such as the physical and biological materials, like the stems, branches, leaves and plant remains, although dry, degradation or dehydrated, as well as biomass, perimeters, land, forests, soils, substrates and buildings, it is going to allow them to be endowed with the properties of the present invention, which is especially important for technical, logistics and economy to combat the spread of heat, particularly with regard to forest fires.

For the present invention are also characterized alternative, independent and sufficient steps, but integrable for carrying out the present invention, among them mixing/permeation/attachment in an aqueous medium (for release, humidification, sauce, soaking, dipping, infusion, drip, spraying, vaporization or humidified ventilation, among others), mixing/permeation/mechanical fixing (by mixing, press, force, interlacing, interweave, fitting, pressure, blowing, spray, suction, ventilation, smoking, inlay, juxtaposition, agglutination, among others), mixing/permeation/attachment by thermal differential, mixing/permeation/electrostatic/electromagnetic fixing, mixing/permeation/attachment by vulcanizing, mixing/permeation/attachment by polymerization, mixing/permeation/attachment by sealing, encapsulation, imprisonment or entrapment and mixing/permeation/attachment face of pressure and temperature variations.

It is a first objective of the present invention to provide matter, bodies, fluids, products, substances and materials resistant to heat and fire, its spread, creation, consumption and propagation. It is intended, with the invention, constitute materials which, have undergone contact with heat, fire or spark, be able to withstand the heat and fire affecting them, create or install in them, degrade them, consume them, feed on them or propagate through them in space or in other materials.

The material made from the invention is provided with heat and fire resistance properties, preserving from the possible action of these and protecting the third materials. Third materials are protected by the barrier to heat and fire the material comprised by the invention becomes in relation to heat and fire. The purpose is, for the material and third materials, to immunization, to combat and control the thermal and physical action of heat and fire, having applicability in materials that want to provide these characteristics and situations, materials or environments hazardous, constituting as raw materials for construction goods which lend him their properties and are used as a barrier or coating, or, even, in equipment requiring such protection or coating.

Note that, therefore, the present invention provides a new mechanism for firefighting, configured by the existence of fire resistant material (the object of the invention) and its possible use as a "barrier" constituted to fire, placing it as an obstacle to it or above it (muffling it without it consumes the material), situations that cause, even, the fire is extinguished absence of fuel. It is established, thus, a new paradigm, in which the fire is fought by the material it naturally consumes. In this bias, it reaffirms the usefulness of the invention as immunization, prevention, combat and control of heat and fire.

A second objective of the present invention is to constitute matter, bodies, fluids, products, substances and materials resistant to degradation of materials from the action of heat and fire, combustion and pyrofagia, and its structure preserved and avoided losses from deterioration and material loss. Again, materials that are not consumed by the fire and does not degrade in the presence outweigh the simple advantages not spread of fire and are very useful for application to materials which it is desired to provide these characteristics and conditions, materials or environments risk, whether constituting a raw material for construction goods which lend it its properties or being used as a barrier or protective coating or even both are used in equipment requiring such protection or coating.

A third objective of the present invention is to provide matter, bodies, fluids, products, substances and materials that, exposed or subject to contact with heat and fire resistant, resist so that occurs the reduce of volatilization, of gas emission (among which derivatives of carbon), of smoke and of carbon release from them, with positive environmental impacts, among which the reduction of carbon emissions into the atmosphere. This goal has two biases. At first, the objective is to made heat and fire resistance so that, even if a continuous exposure to heat and fire, given the control of the action of heat, fire and spark on the consumption of materials, occurs reducing emissions of gases and smoke as well as carbon release, which usually derive from the action of heat and fire. In second place, it is aimed to enable, if desired, the thermal printing and the carbon synthesis, simply by maintaining continuous and prolonged exposure to heat and the resistant material heat, since carbon is not released and remains proportionally high in the material in this circumstance.

This objective involves great social, economic and environmental benefit, since, in addition to preserving the material and prevented environmental contamination, may be marketed credits from the proven reduction of carbon emissions. Economic benefits can also result from the broad applicability and low cost carbon aforementioned synthesis, improving the alternatives for obtaining the same.

A fourth objective of the present, invention is to constitute matter, bodies, fluids, products, substances and materials resistant to exposure to the heat, the fire, the spark and its subsequent explosion. The objective is to establish, provide resistance or protect naturally susceptible materials such occurrence, especially naturally explosive charges, such as gunpowder and rounds of ammunition for firearms. Furthermore, the application of the process of explosion-susceptible material ready and provides a means of inactivating their explosive charges. In this way, the objective is to raise a new paradigm of power of action against explosive charges and prevent its lethal action, inactivating its cargo and making sterile, especially the shooting of firearms. Reaffirms that, given the aforementioned strength properties, it is possible avoid explosions by arcing, which includes the trigger fire projectiles. With the invention, the objective is particularly to provide a basis for a change in fighting strategy firearms since, among other purposes, can inactivate ammunition rather than grasping arms.

A fifth objective of the present invention is to provide the first, second, third and fourth objectives for both field, bodies, fluids, products, substances and materials in manufacturing/or constitution as ready for physical and biological materials existing. Note that, by the invention, it is intended to constitute materials where resistance properties are present. It means to manufacture or endow materials with resistance. Thus, the objective of the present invention is also to provide these properties to existing materials, enabling materials already ready existing or used are provided such properties and are preserved, especially given the risk of being affected by fire, they are physical or biological such as stems, leaves, bark, woods and forests, although dry, dehydrated or degradation.

In the case of physical materials, will be allowed the preservation of existing materials, ready materials or the constitution/manufacturing of materials, including biomass, perimeters, land, forests, soils, substrates and buildings, by creation of resistant materials or by formation of barriers with use of such materials to preserve the third materials. In the case of biological materials, it will be possible, among other things, preservation of woods and forests exposed to risk of heating, heat, fire, wildfire or burning, especially if they are also under conditions that increase the risk, such as low humidity and dry vegetation. Thus, biological materials, such as those that form the woods and forests can be protected, avoiding damage to flora and fauna due to its heating and consumption by contact with fire. To do this, one can apply the present invention only on certain perimeter, it is not necessary to apply the entire forest, because the heat and the fire did not pass the protected perimeter. The damage from carbon release into the atmosphere by the burning of physical and biological material are also avoided, as well as to avoid, in the case of fire, the damage from possible fire spread to urban areas.

A sixth objective of the present invention is to create matter, bodies, fluids, products, substances and new materials, with the presence of features present in the first, second, third, fourth and fifth objectives. Thus, matter may be used as a singular element in that are present resistance properties, as well as input for the creation of other materials or products that lend him such properties (whether final goods or other inputs), or even as vehicle or device of the heat resistance and fire process, before or during the exposure to these. In one of these applications, the mixture of sulfuric acid to the material to be endow with such property could be replaced by aggregation or mixture of material possessing these properties (in other words, already provided sulfuric acid content) to the material which is desired to endow with such property (whether it also input or well final). This increases the scope of matter and materials that can be used and can result of the process, since the sulfuric acid content can be conducted directly to the material that is desired to provide resistance, or indirectly, is present in other substances or materials which becomes part of the material that one want to provide resistance.

This also allows some advantages, such as minimizing toxic, since the sulfuric acid content can be isolated within the material or material that can integrate the material that is desired to provide resistance. Consider that some of the new products and established or having material resistance can come to serve as inputs for resistance constitution in other materials, isolating its toxicity. In the limit, it can be, of a more complex form, the sulfuric acid content in capsules in substance or material isolated that serve as input to other materials and give them resistance. In a less complex way, a simpler input could be the sulfuric acid in aqueous medium, that can be used directly in the material, serve as input or put up as a barrier, having capacity, even, to isolate perimeters.

A seventh objective of the present invention is to make the matter, bodies, fluids, products, substances and materials from the process to work as a protective device to be combined with other materials or products. The first type of device is the material itself that can be created and passed to serve as a tool to form other materials with resistance properties. The second type refers to specific materials that can be created and go on to serve as devices. As a result of the seventh objective of the invention can be applied to all known materials, as it may be inserted in any technical building materials or be applied to any existing materials.

A eighth objective of the present invention is that the basic process is featured by a variety of steps, alternative and independent, however integrable each other, allowing achievement of the first, second, third, fourth, fifth, sixth and seventh objectives, as well as use of a variety of existing devices or created devices for carrying out the process and utilize manufacturing steps/constitution in which the process can be applied.

A ninth object of the present invention is the controlled synthesis of structures and thermal printing. This is because accomplished the first stage of the process, to provide resistance, can succeed it with a controlled exposure or not to the temperature and pressure variations, a situation which results in increased hardness material with carbon retention and thermal printing area affected by heat, which can result in structures synthesis applications and/or thermal printing. Combining the temperature rise with increasing pressure, especially for levels, components and environments that reproduce existing in the hydrocarbon formation environment (especially kerogen, oil and natural gas), the synthesis may result in new structures carbon, including coal and new structure of hydrocarbons equal or similar to the kerogen, oil and natural gas, allowing new applications techniques, logistics, energy and industrial.

The objectives of the present invention are realized with the process, matter, bodies, fluids, products, substances and materials that are of general applicability, easy logistics and cost, with infinite scope of materials that can be endowed with resistance, generating material benefits, immaterial, economic, human (the preservation of materials, construction, minds and lives) and environmental (the preservation of fauna, flora and contribution to the reduction of carbon emissions).

Such a solution is given in accordance with the present invention by a process and products, including, not exhaustively, matter, bodies, fluids, substances and materials for material resistance (physical, chemical and biological) to temperature and pressure variations (natural, accidental or controlled), to heat and fire, the contagion, creation, consumption and propagation of these, the degradation of materials, the combustion, the fire consumption, the volatilization, the emission of gases, the release of carbon, the spark and the explosion, as well as to allow the controlled synthesis of structures, the increase carbon content, term prints and their use.

The invention is based on the addition, incorporation, distribution and/or fixing a sulfuric acid content to a "material object", so defined that you want to establish or provide the properties of the present invention, on the natural state of "material object" before, during or after its creation/production (when applicable) or while he was there ready (new, used or existing), preferably (in particular) using a vehicle, preferably (in particular) water. Included in the definition of "material object" matter, body, fluid, product, substance or material that will be formed or provided with resistance by the present invention, whatever it is, physical or biological, organic or not, fuel, oxidizer or not, hydrophobic, hydrophilic or not, homogeneous or not, dense, hollow, laminated or not, solid, liquid or gaseous, preferably (particularly) biomass, perimeter, land, forest, soil, substrate or building, organic material, cellulosic (wood, stems, branches, leaves, pulp, fiber, paper pulp, paper pulp, cellulose pulp, cellulose gum, wood pulp, paper pulp, paper fiber, dust, bran, wood chips, bark or vegetable chips, among others), mineral, rock, sand, land and clay, construction element, waterproofing or paving element, vegetable, animal or mineral, synthetic or mixed fiber, yarn, fabric, mesh, fabric, felt, blanket or layer, fluid, liquid, polymer, gel, paste, wax, mass or texture, foam, resin, emulsion, capsule, pouch, membrane, filter, touch, carrier, as well as the inputs, phases, layers, interiors or surfaces of these and any other materials, organic or inorganic, such as stems, branches, leaves and plant remains, even if dried, dehydrated or in degradation. It is possible to additionally make the addition, incorporation, distribution and/or fixation an equivalent content of acetic acid to the vehicle or to the "material object".

What proceeds is to endow matter, bodies, fluids, products, substances and materials or inputs, phases, layers, interiors or surfaces of these and any other materials, are including biomass, perimeters, land, forests, soils, substrates and buildings of a sulfuric acid content of, preferably, 0.1 to 10%, more preferably from 0.5% to 5%, preferably added by aqueous vehicle, equivalently permeation "material object" in diluted sulfuric acid in water preferably at a concentration of 1 to 10%, preferably at normal temperature and pressure conditions. The temperature and pressure conditions, the content and the incorporation mode can vary and be set experimentally depending on the physicochemical characteristics of each "material object" such as weight, density and permeability, the environment in which it finds itself, level resistance one want to use and the type of structure that one want to have after the casual or deliberate contact with heat. Note that, strictly speaking, there is no lower limit or higher for content to be used, since, on one side, although it does not reach a possible lower limit, some resistance is conferred, even occasionally or partial and on the other hand, even if it exceeds a possible upper limit, for example, exceeding the saturation point of a mixture, the excess sulfuric acid can be configured as stock reserves. At the same step, although the permeability of the "material object" is small, one can employ the present invention, since the same can be fixed sulfuric acid thereto, as well as any of its inputs, phases, layers interior or surfaces. Thus, it is evident that the sulfuric acid use can be made even in the event of absence of minimum and maximum values, failure or saturation, although respect for points of failure or saturation are valid references to be employed. It is evident also that there is the additional possibility of using existing procedures in the art or manufacturing process of any product.

The way the measurement and the amount of addition, embedding, distribution and/or fixing a sulfuric acid concentration may vary, but should preferably conform to the reference correlation process indicated in this document, so that the content and the final amount of sulfuric acid present, built, distributed and/or fixed in the composition of "material object" are equivalent (or keep referential correspondence) to those who would have the "material object", although it was a final product, had been exposed to permeation by sulfuric acid in aqueous medium and drying (this applies if or desirable). Taking as an example a sheet of paper, cellulose, wood pulp or wood that is desired to be in resistance, the amount of sulfuric acid present in the final composition (having sulfuric acid introduced during manufacture/formation or after it) must be equivalent to what would have on a sheet of paper, cellulose, wood pulp or wood like already ready to be subjected to permeation of sulfuric acid in aqueous medium and then dried (this applies if or desirable).

As a starting point for use of the desired content of sulfuric acid, the basic reference of the present invention from which adjustments can be made is 0.05 grams (10 mm3 or 1 drop) of sulfuric acid diluted in water with preferred concentration of 0.1 to 10% (thereby, adding, embedding, distributing and/or fixing sulfuric acid on the preferably equivalent weight from 1/1000 to 1/10 the weight of a drop) for each 6.4 to 10 mm3 (100 mm2 by 0.1 mm thick) of a reference "material object" with weight, density and volume corresponding to 75 g/m2, 0.75 g/cm3 and 64 to 100 mm2 area by 0.1 mm thick. Considering this correspondence, can be taken as reference the addition of a portion of sulfuric acid in aqueous medium to a part of the "material object", or 10 mm3 volume of each, or 0.05 grams of sulfuric acid diluted in water for each 0.075 grams of "material object" in weight and subsequent drying of the material (if applicable or desirable). Preferably, this ratio should be as greater as higher the density of the "material object", for example, for a "material object" with twice the reference density, endow it with double of sulfuric acid diluted in water of the reference.

There is preference for aqueous vehicle, since sulfuric acid is fully soluble in water, and this configuration is desirable when applying the content. Note that, even if deemed necessary the use of an aqueous vehicle to apply the content of sulfuric acid, the absence of this vehicle does not spoil the process and objectives of the present invention, since may be employed sulfuric acid in the material for a second time, if necessary, bathe it with water and make this solvability. Likewise, considering the vehicles and means of adding sulfuric acid content to a "material object", even if the "material object" has no contact with an aqueous medium during its formation/manufacture, the present invention can be applied. Besides the use of other vehicles and means, sulfuric acid without water can be applied for subsequent waterlogging or not. One can, also, provide a content of other material to which sulfuric acid has been effectively added (preferably in aqueous medium and subsequent drying) to a "material object", so that even a "material object" to which the present invention apparently do not apply, it may be applied, because the presence of an material added with sulfuric acid in a "material object", for example, composing 50% of it, will cause even a material to which the invention apparently is not applicable might be endowed with the features of the present invention, in this case 50% or more.

Permeation of sulfuric acid in aqueous medium (after drying, if desired or necessary) is a reference and is also characterized by being a preferred modality of the present invention. It has proven to be advantageous this mode for ease of its use and to better control the content of the final concentration of sulfuric acid in the "material object", since it is directly seized the amount to which the material has been submitted. If insufficient, the applied amount can further be increased. This preferred embodiment also has the advantage of providing material resistance to already ready materials (new, existing or used), without the need of an industrial process and can be applied quickly, which is useful in emergencies. However, there is great flexibility for the use of the process. In the process characterized, one may apply vehicles other than water (such as gel mixture, preferably aqueous, mineral, rock, sand, soil and/or clay, other solvents and powders, among others), use other states of matter (solid, liquid and gas), vary the suggested concentrations of sulfuric acid, change the conditions of temperature and pressure and heat exposure time, especially in the case of caused structures synthesis, choose any step of manufacturing/constitution of the "material object" in which employ the process, the mode and extent of incorporation of sulfuric acid to the material object. One can opt for sealing, isolating, modulating plasticity and/or waterproofing one or more inputs, phases, layers, interior or surface of the "material object" in order to avoid loss of that was added to the "material object", which could result in imbalance in the addition and contaminate the environment. The exact amount of sulfuric acid to be added for each "material object" may be adjusted experimentally based on primary reference and be adjusted for, among other reasons, to compensate for different densities and permeabilities of the materials, any losses during formation/manufacture of each material or that would be due to the passage of time or exposure environment. This flexibility improves also its natural, industrial and postindustrial applicability from the technical, logistical and economical points of view.

This may mean that, being sulfuric acid in aqueous medium added during the manufacturing process/formation of a "material object" or even after, for a "material object" in reference end 0.75 g/cm3 density, 64 to 100 mm2 (1 cm2) area and 0.1 mm thick, the introduction of sulfuric acid in aqueous medium during manufacturing/or after the incorporation, must be one that allows, at "material object" end, the resulting additionally, embedding, distribution and/or fixing sulfuric acid preferably by aqueous means is equal (or proportional) to the addition of 0.05 grams (10 mm3 or 1 drop) of diluted sulfuric acid in water with a preferred concentration of 0.1 10% (thereby giving added, embedded, distributed and/or fixed sulfuric acid on the equivalent weight preferably 1/1000 to 1/10 the weight of a drop) for each 6.4 to 10 mm3 (100 m2 by 0.1 mm thick) of a "material object" reference end with said weight, density and volume (75 g/m2, 0.75 g/cm3 and 64 to 100 mm2 area by 0.1 mm thick), and subsequent drying of the material (if this applies or desirable).

It is important to note that, depending on the concentration or amount of sulfuric acid in material processing or in the final product, one can reach toxic levels. Thus, the possibility of their occurrence, one can coat the material that has been treated by the process with a layer of sealant material, insulator, plasticizers modulating and/or waterproofing, so that the sulfuric acid toxicologically not contaminate the environment. A possible example coating, cited above, is the role of the coater, or more simply the application of a protective surface wax.

Obviously, when it is a process characterized by endow a "material object" of a sulfuric acid content, preferably by aqueous means, there is preferably, but they are almost infinite ways to do it. Similarly, there is an almost infinite number of "material object" achievable by the present invention. Just as there are several ways to provide a 'material object" of a sulfuric acid content, there are several "material object" possible and each has weight, density, permeation capacity and diverse nature. Any adjustments can be made considering these variations and, in any case, the possibility to make adjustments after an initial attempt, is also a positive differential.

The present invention also relates to steps to perform the process according to the present invention. Such steps may be used independently and sufficiently, by selecting only one among all, or combined by choosing more than one, so that they complement each other. These steps are described below.

The step of mixing/permeation/fixation in an aqueous medium, allows to provide, directly or indirectly, a "material object," any of its inputs, phases, layers, interior or surface of the desired content of sulfuric acid by adding sulfuric acid diluted in water to the "material object", any of its inputs, phases, layers, interior or surface (as the part to be protected). The step of mixing/permeation/fixation in an aqueous medium is characterized by the addition, incorporation, distribution and/or fixing of the sulfuric acid content, preferably by release, humidification, sauce, soaking, immersion, infusion, drip, spray, vaporization or humidified ventilation, among others, from the diluted water sulfuric acid, preferably at a concentration of 1 to 10% (sulfuric acid water), to the "material object," any of its inputs, phases, layers, interior or surface (as the part to be protected). This procedure may be done on the natural state of "material object", before, during, after its creation/production (when applicable) or when it is ready (new, used or existing) and can be followed by drying of the matter (this if desirable or applicable). A desirable application of such step constitutes a release sulfuric acid in the aqueous vehicle to the "material object", introducing sulfuric acid in aqueous medium within the same or dipping it into a container filled with sulfuric acid in an aqueous medium preferably at a concentration of 1 to 10% (sulfuric acid water) long enough for the "material object" is completely permeated or impregnated. Note that it is possible to achieve the "material object" in other ways such as spraying sulfuric acid in aqueous medium over the material and passing the material through a conveyor along which spray cast on it sulfuric acid in an aqueous medium preferably in a concentration of 1 to 10% until it is completely permeated. Only wishing to provide the layer, phase or surface of the "material object" by the sulfuric acid content in the aqueous medium added, is sufficient that these are completely permeated or sulfuric acid have fixed to their surface. Obviously, the addition of sulfuric acid can be graded in terms of both content and scope in "material object" if, for example, admit to provide the "material object", any of its inputs, phases, layers, interior or surface with a lower protection level or even be enough to avoid a specific goal, such that the heat and the fire from spreading, in which may be sufficient to embed the sulfuric acid on the surface of the material object. Note that, in cases where materials to be endowed with resistance that, during their manufacture, have been in contact with sulfuric acid, the sulfuric acid addition to material of the process is equivalent to the "not wash" of the material for removal of sulfuric acid.

The step of mixing/permeation/fixation mechanical allows to provide, directly or indirectly, a "material object", any of its inputs, phases, layers, interior or surface of the desired content of sulfuric acid added with the aid of mechanical procedures in your state natural, before, during, after its creation/production (when applicable) or being the same ready (new, used or existing). The step of mixing/permeation/fixation mechanical is characterized by the addition, incorporation, distribution and/or fixing of the sulfuric acid content to the "material object", any of its inputs, phases, layers, interior or surface (as it is the part to be protected), by mechanical way, combinable with each other, preferably mixing, compressing, pushing, twisting, weaving, fitting, pressing, blowing, spraying, sucking, ventilating, smoking, inlaying, juxtaposing or bonded sulfuric acid to part or all to be protected, which can be done mechanically with the aid of shovels, press, blowers, fans, smokers, as well as a mechanism to graft blowing, inlays, juxtaposing or using existing mechanisms in the art or manufacturing process of a possible product, which also applies to other products and processes of the present invention. This procedure can be done at the natural state of "material object", before, during, after its formation/manufacture or while it is ready (new, used or existing) and may be followed by further soaking in water or humidification in water of the "material object" and drying (this, when desirable or applicable). More preferably, by the mixture, which, preferably with the use of blades, sulfuric acid or a material with sulfuric acid content is mixed with the material to be endowed with resistance. By the force, which preferably using a press, sulfuric acid or a material having sulfuric acid content is grafted onto the material to be endowed with resistance. By interweaving, sulfuric acid or a material having sulfuric acid content as a thread processed by the present invention, is interlaced to a "material object", which may be, for example, another wire to form a braided, woven, knitted or weft. By pressure, which, preferably placing the material to be endowed with resistance to pressure chamber 9 bar, for example, sulfuric acid impregnates the interior of the material to be endowed with resistance. By blowing sulfuric acid, by the ventilation/smoking or by vaporization, in which, preferably, sulfuric acid is brought inside the "material object" to be endowed with resistance (or its phase, layer, interior or surface) for as long as it is necessary to impregnate it with the aid of air displacement (forced or not) on the material. In this sense, this can be done preferably at pressurized environment, to reduce the time required for impregnation of the material. By spraying, where preferably the material to be endowed with resistance, placed in a tube between sulfuric acid and air/liquid sucking supply, is permeated with sulfuric acid, that, for sulfuric acid to reach the sucking source, through suction, it have to go through the material, permeating it. Sulfuric acid may be added to the aqueous medium, through another vehicle or equipment (such as gel mixture, preferably aqueous, rock, sand, soil and/or clay, other solvents and powder) that already has a sulfuric acid content, or, even, alone for subsequent waterlogging or not. This step allows the creation of a final resistant material, with the possibility of gradation of sulfuric acid addition to higher levels and having applicability when the constitution/manufacturing of materials. During the manufacture of recycled paper, for example, may be added sulfuric acid to the paste that will result in the paper. When the paper is ready and dried, it will have the resistance properties. During the manufacture of wood boards chipboard of wood meal or plywood, sulfuric acid may be added mechanically, for example, to the meal that is pressed given rise to the board.

The step of mixing/permeation/fixing by thermal differential allows to provide, directly or indirectly, a "material object," any of its inputs, phases, layers, interior or surface of the desired content of sulfuric acid added with the aid of thermal differential procedures in its natural state, before, during, after its creation/production (when applicable) or being the same ready (new, used or existing). The step of permeation/fixing by heat differential is characterized by the addition, incorporation, distribution and/or fixing the sulfuric acid content preferably totally impregnating the "material object," any of its inputs, phases, layers, interior or surface (as is the part to be protected), preferably heating the "material object" of reference (to dilate it during exposure to impregnation) or cooling it (so that the moisture due to the applied cooling degree load sulfuric acid into the material during impregnation), subjecting to thermal variation a part or all of which want to be protect (preferably +40 to +120° C. for the "material object" in case of heating and preferably −8 to −280° C. in the cooling case) in the presence of dispersed sulfuric acid in the same environment or closed container, so that occurs naturally impregnating the "material object" by diluted sulfuric acid in water, preferably at a concentration of 1 to 10% (sulfuric acid water), which may be dispersed, sprayed, smoked, vaporized, ventilated or particularized in the air. This procedure can be done at the natural state of "material object", before, during, after its formation/manufacture or while he ready (new, used or existing) and can be followed by drying of the material (this when desirable or applicable). This step preferably uses temperature differentials, causing sequential dilation and/or contraction of the "material object", any of its inputs, phases, layers, or inner surface (or vice versa), paving the way for it to be permeated. Preferably, it consists of two modules, with one chamber each, the first for expansion and the second to the contraction of the material (or vice versa), both carried out in the presence of sulfuric acid with moisture of the respective chamber or vaporized inside the same. At low temperatures, below 3° C., in the presence of moisture, there is a tendency for the material to be permeated by moisture, which can lead sulfuric acid, for example, vaporized or already added moisture, to the interior of the material. The expansion and contraction of the material are effective to change the space between molecules of the material, allowing the passage of moisture, for example, sulfuric acid can lead to the interior of the material. The expansion of the material can be achieved by exposure thereof to heat inside the expansion chamber, for example, 40° C., and this sulfuric acid (for example, sprayed or associated with moisture from the chamber), to then submit the materials to contraction. They can be switched to expansion and contraction of the material as often as necessary to make it permeate sulfuric acid. Naturally, this will occur inwardly of the material, may be satisfactory the cycle interrupt when the outer portion is already permeated, since it indirectly protects the center. There is possibility of using other forms of contraction, which, preferably, a desirable application for the contraction module consists in the submission of the material to liquid hydrogen, cooling the material. Although this remove much of the moisture in the material, will cause it to become quite compressed. To return to its natural state, will dilate leading inward air chamber which, with sulfuric acid in the internal or vaporized moisture, that will carry sulfuric acid into the material.

The step of mixing/permeation/fixation electrostatic/electromagnetic allows providing, directly or indirectly, a “material object”, any of its inputs, phases, layers, interior or surface of the desired content of sulfuric acid added with the aid of electrostatic/electromagnetic procedures in its natural state, before, during, after its creation/production (when applicable) or being the same ready (new, used or existing). The step of mixing/permeation/fixation electrostatic/electromagnetic is characterized by the addition, incorporation, distribution and/or fixing of the sulfuric acid content of the “material object”, any of its inputs, phases, layers, interior or surface (as is the part to be protected), preferably by fixing sulfuric acid electrostatically/electromagnetically to all or part to be protected, which can be done with sulfuric acid being in powder, liquid state with or without solvent/vehicle, and preferably with electrostatic application based on a potential difference (which may vary between 88,000 and 108,000 V) between the surface of the “material object” to be protected, earthed hooks, and the particles which are to be aggregated. Such particles, fluidized or vaporized, pass at low pressure through electrodes negatively charged and are electrostatically charged. Upon reaching the surface of the material, they are aggregated on their surface. This applicability has greater effect on metals such as firearms cartridges and control of explosives, to inactivate its charge. It may also be successfully used to cover surfaces, preferably (in particular) metal with a protective layer that can be combined, even, with paint before or during application. This procedure can be done about the natural state of “material object”, before, during, after its formation/manufacture or while he ready (new, used or existing) and can be followed by further soaking in water or humidification water the “material object” and drying (this when desirable or applicable). It should be noted that, to provide resistance to the material, it is not necessary to impregnate all the material with sulfuric acid. Given the features of the present invention, as it prevents the spreading of heat or fire from the area affected by the heat to the other, it is possible that protecting the area that will be affected by heat by adding sulfuric acid, take cover indirectly other areas, even if they have not been permeated with sulfuric acid. This is a property that applies to all described herein. That said, it is explained that, by fixing sulfuric acid on the surface of materials, protect itself inside, even if it is not permeated with sulfuric acid. For electrostatic fixation step, sulfuric acid may be powdered, liquid state with or without solvent/vehicle, among others.

The step of mixing/permeation/fixation by vulcanization allows providing, directly or indirectly a “material object”, any of its inputs, phases, layers, interior or surface of the desired content of sulfuric acid added face vulcanization, in its natural state, before, during, after its constitution/manufacturing (when applicable) or being the same ready (new, used or existing). The step of permeation/fixation by vulcanization is characterized by the addition, incorporation, distribution and/or fixation of the sulfuric acid to “material object”, any of its inputs, phases, layers, interior or surface (as is the part to be protected), preferably prior to vulcanization of “material object” (for example, latex or rubber), and then vulcanizing it, the added material being applied to the “material object”, any of its inputs, phases, layers, or surface, even if the final impregnation after the vulcanization is not total. This procedure may be done on the natural state of “material object”, before, during, after its formation/manufacture or while he ready (new, used or existing) and can be followed by drying of the material (this when desirable or applicable). The vulcanization is a chemical reaction that can be processed cold or hot, formed by the chemical combination in particular with the rubber bodies vulcanizing agents, in particular sulfur. It may be explained by the interconnection of hydrocarbon molecules through atoms or molecules of the vulcanizing agent bound to carbon atoms that had originally double bond. The combination reaches a maximum sulfur content close to 32%, theoretically all that which saturates the double bonds. The rubber and foam rubber manufactured with latex foam and vulcanization may have the added sulfuric acid in any of its stages of formation/manufacture, as well as ready-made, although used in the final product, especially in the form of coverings, upholstery and in other applications in which resistance characteristics of the present invention are useful.

The step of mixing/permeation/fixation by polymerization enables provide, directly or indirectly a “material object”, any of its inputs, phases, layers, interior or surface of the desired content of sulfuric acid added to polymerization aid in its natural state, before, during, after its creation/production (when applicable) or being the same ready (new, used or existing). The step of permeation/fixation by polymerization is characterized by the addition, incorporation, distribution and/or fixing of the sulfuric acid content of the “material object”, any of its inputs, phases, layers, interior or surface (as is the part that want to protect), preferably prior to or during the polymerization of the “material object” (for example, vegetable polymer such as castor oil, mineral or synthetic), and then polymerizing it, leaving the added material applied to the “material object”, any of its inputs, phases, layers or surface, even if the final impregnation after the polymerization is not complete. This procedure can be done on the natural state of “material object”, before, during, after its formation/manufacture or while it is ready (new, used or existing) and may be followed by drying of the material (this when desirable or applicable). The preferably step constitutes polymers with sulfuric acid content, preferably added by aqueous medium, during the polymerization of a polymer (whatever polymers and applied polymerization processes), preferably by radical or ionic polymerization, for example, from the gellan gum or other polysaccharides with gel forming ability ionic polymerization, individually or in combination, so that the polymer passes to possess resistance properties described in the invention or may be used to protect other materials. Additionally, capsules may be formed (obtained by using a peristaltic pump) and microcapsules (obtained by using a capillary spray with high pressure) from such polymers, that may serve as resistant capsule or contain material processed by the present invention encapsulated. As polymers, can result from the step, at any of its stages of formation/manufacture, as well as ready-made, although used in the final product, also plastics, foams and rubbers that may be applied to paints, varnishes, adhesives and any materials used as coating, with improved resistance of the coatings. In this sense, it applies since to the manufacture of an automotive upholstery leather with sulfuric acid mixed/permeated/fixed by step (or fixed to the surface of a pigment processed by the present invention), making it more resistant to temperature variation, to heat and to fire when exposed to the sun or other heat source, such to the foam that form the seats.

The step of mixing/permeation/fixation by sealing, encapsulation, entrapment or imprisonment allows to provide, directly or indirectly, a "material object", any of its inputs, phases, layers, interior or surface of the desired content of sulfuric acid in your natural state, before, during, after its formation/manufacture or while it is ready (new, used or existing) and can be followed by drying of the material (this when desirable or applicable). The step of mixing/permeation/fixation by sealing, encapsulation, entrapment or imprisonment is characterized by the addition, incorporation, distribution and/or fixing of a sulfuric acid content, filling, coating and fully involving the same, any of its inputs, phases, layers, interior or surface (as the part to be protected), preferably forming a content layer and/or protective/retainer, on which preferably may apply a waterproofing sealant. Sulfuric acid added as coating may be diluted in water or distributed in other material used as carrier for the coating, such as wood pulp impregnated with sulfuric acid diluted with water at a preferred concentration, which, after applied as a coating to form a protective layer, preferably it should be followed by the application of a waterproofing sealant, encapsulating, entrapping or imprisonment. Sulfuric acid can also constitute the contents of the sealed, encapsulated, trapped or pocketed assembly, being in solid, liquid or gaseous vehicle, or, even, added or not to other materials, followed by the common coating or from the present invention. This procedure can be done at the natural state of "material object", before, during, after its formation/manufacture or while it is ready (new, used or existing) and can be followed by drying of the material (this when desirable or applicable).

The step of exposure to temperature and pressure variations in time, preferably for processing structures, where provided before, during or after the addition, incorporation, distribution and/or fixation of sulfuric acid content, the "material object", any its inputs, phases, layers, interior or surface are subjected to temperature and pressure variations, keeping the same preferably at a temperature of −300 to 1000° C. and under pressure 0-70000 ATM during the time needed to transform its structure (in especially energetic properties, strength and/or hardness as well as thermal and electrical conductivity) and/or enrich it with carbon, preferably to obtain carbon, coal, methane hydrocarbon and, most preferably, in heavier hydrocarbons, preferably hydrocarbons n-alkanes. More preferably, temperatures of 0 to 800° C. (more preferably to 50° C. for processing into coal, 80° C. for oil processing, 130° C. for gas processing, 700° C. for charcoal processing and 800° C. for ceramics, clay, cellulose, ground, floor and other materials that want to provide high resistance). Preferably for the formation of hydrocarbons, pressure equal to or greater than 20000 ATM (2 GPa). Additionally, one can employ the method of obtaining hydrocarbon, preferably Fischer-Tropsch catalysis, or other, where in the presence of transition metal catalysts (iron—Fe, nickel—Ni and cobalt—Co), the hydrogen reacts with carbon dioxide and result in n-alkane hydrocarbons. Especially in the case of obtaining carbon, coal, oil, gas and other hydrocarbon, residues, compounds or sediment rich in carbon, preferably organic carbon (preferably having as a "material object" organic matter, cellulosic materials, terrestrial plant debris, algae, phytoplankton, zooplankton, bacteria, among others) or carbon (carbon dioxide, or methane, among others), the addition, incorporation and distribution of the sulfuric acid content may be in any of its stages, from the accumulation of matter organic and inorganic sediment in deficient oxygen environments (where the organic material, although preserved oxidation, undergoes changes resulting inorganic chemical reactions and the action of bacteria), the bitumen (anaerobic decomposition of organic matter), the formation of kerogen (rich material in too heavy solid hydrocarbons, with organic macromolecules resulting from the breakdown of lipids, carbohydrates and proptides of decaying organisms, whose resultant formation of the previous steps occurs with the generation of a gas and the transformation of the remaining organic matter in kerogen), to the "windows" of carbon, coal, oil (temperature between 50 and 150° C. and depth between 1500 and 4500 m), gas (when the temperature exceeds 150° C., fails to form oil and begins to form gas natural) and other hydrocarbons. This procedure can be done on the natural state of "material object", before, during, after its formation/manufacture or while it is ready (new, used or existing) and can be followed by drying of the material (this when desirable or applicable).

Points to products resulting from the process, including, not exhaustively, matter, body, fluid, product, substance or material, physical and biological, organic or not, existing or in production, whatever they are, combustible, oxidizer or not, hydrophobic, hydrophilic or not, homogeneous or not, dense, hollow, laminated or not, isotropic or not, solid, liquid or gaseous, characterized by comprising a sulfuric acid content added, embedded, distributed and/or fixed, preferably to its composition, any of its inputs, phases, layers, interior or surface, preferably with the preferred composition from 0 to 99.9999% by weight of "material object", any of its inputs, phases, layers, or surface, 0,0001 to 99.9999% of sulfuric acid, 0 to 99.9999% of vehicle, 0 to 20% of sealant agent, 0 to 20% of insulating agent, 0 to 20% of plasticizer modulating agent, 0 to 20% of waterproofing and 0 to 99.9999% of other elements, vehicles, excipients or known in the art, there may be sealant, insulation, waterproofing, or plasticizer layer between inputs, phases, layers and/or surface. More preferably, matter, body, fluid, substance or material distribution and amount proportional to that flow from the permeation or mixture of matter, body, fluid, substance or material, any of its inputs, phases, layers, interior or surface by sulfuric acid diluted with water preferably in a concentration of 1 to 10% (sulfuric acid water), and thereafter, drying the material, body fluid, substance or material, any of its inputs, phases, layers, interior or surface (drying when applicable or desirable). More preferably, a matter, body, fluid, substance or reference material with 0.75 g/cm3 density, 64 to 100 mm2 (1 cm2) area and 0.1 mm thick, the resulting composition from addition, incorporation and distribution of acid sulfuric preferably by aqueous medium, may include matter, body or fluid, substance or "material object", its composition, any of its inputs, phases, layers, interior or surface and added sulfuric acid, embedded, distributed and/or fixed in weight equivalent of preferably from 1/100 to 1/10 the weight of a drop (depending on whether it was concentrated in water from 1 to 10%). This is because the resulting present in the composition of matter, body or fluid, substance or material can be one equivalent (and proportional) to the addition of 10 mm3 (or 1 drop) of concentrated sulfuric acid in water from 1 to 10% (thereby giving acid sulfuric added, embedded, distributed and/or fixed on the equivalent weight preferably from 1/100 to 1/10 the weight of a drop) for each 6.4 to 10 mm3 (1 cm2 by 0.1 mm thick) of a matter, body or fluid, substance or the final material with said reference weight, density and volume (0.75 g/cm3 and 64 to 100 mm2 area by 0.1 mm thick), and subsequent drying of the material, body or fluid, material or substance (this when applicable or desirable). If the material is fluid, an aqueous or pulp, can be added only sulfuric acid, preferably at the content of 1 to 10%. All process products are able to fulfill three functions, depending on its use, configured as a vehicle, device or final product for resistance or material transformation. This is because any material, body, fluid, product, substance or material resulting from the process and the present invention can serve as the vehicle for incorporation of the sulfuric acid content to a material other, like device for embedding the sulfuric acid content to a material other after a certain event or other building materials to which you lend resistance properties or as a final product, where it matters acquired resistance itself (with end in itself). In particular, one can adjust the geared up for each function, among the different possible compositions of "material object", sulfuric acid and vehicle: in the case of a device, the composition will have a higher share of sulfuric acid (with 'material object" and the vehicle may tend to zero), in the case of vehicle, the composition will have a higher share of vehicle (with "material object" may tend to zero), and in the case of "material object", the composition will have a higher share of material object. In the case of the configuration and use of the invention as a vehicle, which is enhances the ability of the sulfuric acid content, preferably in an aqueous medium can reach any element existing in nature, constructed or manufactured. In the case of the embodiment of the invention as a device, which highlights is its ability of being near or integrated into a matter or material, can serve as the basis for delivery of the same resistance constitution.

It has been shown, according to the present invention, a wide variety of "subject materials" (subject, body, fluid, material or product) may be prepared by the process, preferably (particularly) biomass, perimeter, land, forest, soil, substrate or building, organic material, cellulosic material (wood, stems, branches, leaves, pulp, fiber, paper pulp, cellulose pulp, cellulose pulp, cellulose gum, wood pulp, paper pulp, paper, fiber, powder, bran, wood, chips, bark or vegetable chips, among others), mineral, rock, sand, land and clay, construction element, waterproofing or paving element, vegetable, animal, synthetic or mixed fiber, yarn, fabric, knit, weave, felt, blanket, or layer, fluid, liquid, polymer, gel, paste, wax mass or texture, foam, resin, emulsion, capsule, pouch, membrane, filter, touch, carrier, as well as the inputs, steps, layers, or inner surfaces of these and any other materials, organic or inorganic, such as stems, branches, leaves and plant remains, even if dried, or dehydrated degradation. Note that several of these materials when their manufacturing/constitution may already have contact with sulfuric acid, since sulfuric acid may already be used in production steps for some of them, such as in the manufacture of rubber, of pulp and paper, to break the fibers and/or bleaching. Moreover, as the process is easy to use, can be easily applied or embeddable to steps of manufacturing/creation of multiple "subject materials", when also can take advantage of existing mechanisms in the steps of manufacturing/constitution of the "material object", whether industrial or natural.

From the application point of view in processes or industrial steps, in the manufacture of cellulose, for example, it is possible to use the invention in several of its stages, from the wood that serves as input for the production of cellulose (for example, eucalyptus) at various stages of manufacturing, such as during the cutting of logs, its peeling, cutting into pieces, transport to the digesters silos, digestion of cooking process (made at the top of the digester silos), wash (made from the center to the bottom of digesters silos), release of fibers (which configures the industrial pulp), second wash for debugging, sieving, stages of the bleaching process (treatment with hydrogen peroxide, chlorine dioxide, oxygen and caustic in five different stages), filter washing, new purification and drying (operation in which water is removed from the pulp until it reaches equilibrium with the ambient relative humidity, 90% fiber and 10% water).

In any of these steps, some of which have an aqueous medium, preferably (particularly) prior to drying. It can be introduced sulfuric acid, so that it becomes present residually in final "material object" in the proportion and the content according to the present invention. Likewise, the present invention can be applied in existing manufacturing processes of other materials, which can also save scope, as is the case of recycling paper, which also utilizes an aqueous medium (in which the paper to be recycled is clustered) and drying.

Even in variants of a "material object" production, the present invention can be applied. In the case of paper, for example, can process the paper according to the present invention before, in previous step, or when coating coated papers, being processed and coated paper. Examples of coated papers are thermal and magazines, which can be submitted to the coater, equipment that can employ a protective surface film to the paper, giving it the coating and finishing. In this sense can the processed paper according to the present invention is coated with common coating, ordinary paper is coated liner processed according to the present invention or both.

From the point of view of application in processes or natural steps, on the action of heat and fire on stems, branches, leaves and dried or dehydrated vegetable waste, biomass, perimeters, land, forests, soils, substrates and buildings, for example, already there is a heat contact on them, which allows that, with the same endowed with the present invention, heat and fire that they would spread would then terminate naturally (for applying fire-fighting, for example).

From the point of view of any application, with continued heat generation (accidental or intentional) are formed concentrated or enriched carbon structures (for structures synthesis applications, in particular carbon, energy applicability, logistics, or industrial) in particular carbon structures, coal, oil, gas and other hydrocarbons, made/manufactured from organic matter which gives rise, through deposition, burial, location in source rock (when applicable, rich in organic matter) or reservoir (where the hydrocarbons are stored) to the subsequent forming steps.

As is known carbon is the most abundant mineral in nature and, depending on their formation conditions, forms ranging from allotropic (as amorphous and crystalline carbon, graphite, diamond, fullerene, and nanotubes) to its chemical combinations which derive, for example, carbon dioxide, carbon monoxide and carbonate rocks (combination with oxygen), hydrocarbons (combination with hydrogen), fatty acids, esters (combination with oxygen and hydrogen) and carbides and acetylides (combination with metals). The various forms may exhibit hardness, electrical conductivity, combustibility and calorific value greater or lesser degree depending on its shape. Some of them are fuel, burn before the flame releasing heat energy and can have high amounts of ash and sulphides. In all cases, in various forms and applications, there are economic, energy and industrial interest.

In its genesis, much of the carbon compounds derives from the deposition and accumulation of organic elements and increase of carbon content, biochemical process that involves an anaerobic decomposition of plant and animal remains, with progressive enrichment in carbon and loss of volatiles. The increase of carbon content is divided into external phase (occurring anaerobic environment, decomposition by action of fermentative microorganisms and processes) and internal phase (fount organic material, thermodynamic processes of pressure and temperature, biochemical processes related to the increased density and the volatile loss and long term), resulting in the decrease in volume material deposited, increased density, enrichment on carbon (increased calorific value) and the loss of volatile and water.

The present invention has applicability in the various steps of the forming process of various kinds of carbon structure, shapes and combinations, spontaneous or provoked, with industrial applicability, regardless particularly the steps involving reducing environment, anaerobic (low oxygen or need to avoid oxidation), thermodynamic processes (pressure and temperature variations), biochemical processes (increased density and volatile loss) and duration. This is because the present invention has properties which permit its employment in the central elements of these processes, especially those involving non-oxidizing and non-volatilization, even in aerobic environment and resistance to temperature and pressure variations, at first retarding combustion and increasing carbon content and a second moment allowing more efficient increase of carbon content, even at higher temperatures, with the presence of volatiles.

Noteworthy is the applicability in the formation of carbon structures, coal, oil, gas and other hydrocarbons. Considering in particular the physical properties of coals (color, density, gloss, hardness) and chemical (calorific value, percentage carbon, volatile and water), the use is possible from the present invention in obtaining similar structures to coal, peat (incomplete increase of carbon content), lignite, coal, anthracite (large calorific value, but difficult combustion), among others. In the case of oil, it applies to the formation process of it, understanding in the broader sense, of complex mixtures and solid, liquid and gaseous variables of hydrocarbons, in the narrower sense, liquid hydrocarbon, liquid rock, fuel, fossil, or natural hydrocarbons, chemical compounds composed exclusively of carbon and hydrogen atoms. It also applies to hydrocarbons in general, whether gas (methane, ethane, propane, butane, among others), solid (bitumen/asphalt/tar, waste, exterior insulation, synthetic and paraffin fibers, among others), liquids (oil crude, oil and oil products: petrol, diesel, lubricating oil, medicinal oil, kerosene, fuel oil and paints, among others), among others.

In addition to carbon and coal, oil, gas and natural hydrocarbons are, in industrial society, relevant source of energy and other technical, logistical and industrial applications. The present invention, in view of its properties, is applied in its various stages of formation, in particularly understood as the accumulation of organic matter and inorganic sediment deficient oxygen environments (where the organic material, although preserved from oxidation, suffer modifications resulting inorganic chemical reactions and the action of bacteria), formation of bitumen (anaerobic decomposition of organic matter), kerogen formation (rich material in very heavy solid hydrocarbons, with organic macromolecules resulting from the breakdown of lipids, carbohydrates and proptides of decaying organisms, whose resulting formation of previous steps occurs with the generation of a gas and the transformation of the remaining organic matter in kerogen), and "windows" of carbon, coal, petroleum (temperature between 50 and 150° C. and depth between 1500 and 4500 m), gas (when the temperature exceeds 150° C., fails to form oil and begins to form natural gas) and other hydrocarbons.

The rocks rich in kerogen, generally fine clastic rocks (shale) or carbonates (limestone and marl Bituminous), are referred to as parent rocks or source rocks because it is in them that will make the oil generation. A parent rock must be more than 0.5 to 1% of organic carbon in the form of kerogen may, in the case of the richest source rocks, contain more than 10%. With continuing subsidence of the sedimentary basin in which took the accumulation of organic matter, this is gradually subjected to higher temperatures and kerogen is transformed, by decomposition of its heavy and complex molecules into simpler hydrocarbons, oil. The density of the oil is in general between 0.75 and 0.9 g/cm3 and is an important characteristic that defines, largely, its value. The transformation begins around 50-60° C. (1200 to 1500 m deep, for a normal geothermal gradient of 3° C./100 m), depending on the type of kerogen. Until about 120-150° C. (3500-4500 m) are particularly generated liquid hydrocarbons and some gas. Once this temperature is found mainly gas generation. Not only is the temperature which influences the volume and the nature of the generated hydrocarbons, but, also, time plays an important role, as in any other chemical reaction. Thus, it appears that older rocks generating initiate generation at lower temperature (depths) and are normally associated with lightweight gas or petroleum accumulations.

The asphalts and bitumens are mixtures of high molecular weight hydrocarbons, primarily solids, which generally correspond to crudes originally liquids which have been biodegraded, oxidized, leached or lighter components lost by other mechanisms. They are mainly on the surface or shallow, filling sand and other porous rocks and filling fractures. Certain precursors of oil may be present in the form of very heavy solid hydrocarbons in rocks such as shales and bituminous limestones. When heated, naturally or artificially, these rocks generate liquid and gaseous hydrocarbons.

The present invention thus important to the process of obtaining natural or caused various materials and products derived from carbon in its different structures, shapes and combinations with economic interest, energy, logistics and industrial, fulfilling conditions for increase carbon content and for hydrocarbons forming, and that, being or not in generating and reservoir chambers, have resulted in the formation of materials enriched with carbon, without necessarily mean the loss of volatiles.

By the present invention, in addition to obtaining the increase of carbon content by preventing the release of smoke from a wood, for example, which is able is to prevent hydrocarbons and other volatile organic compounds evaporate. Can be synthesized, therefore, carbon accompanied by volatile organic compounds, by non-combustible minerals present in the cells trees, for example, like calcium, potassium and magnesium, which otherwise would become ash.

In normal cases, organic compounds begin to vaporize at a temperature of approximately 149° C. Thus, the present invention keeping the presence of volatiles compounds associated to carbon structure, It is going to be interested in all processes that involve heating for release of volatiles, especially coal, charcoal, coke, petroleum, gas, and other hydrocarbons, is to change the point of release, either by keeping them without releasing smoke, available for other types of processing. Take as an example the coke, heating coal in the absence of oxygen to remove organic compounds, which smoke produced by the process becomes valuable, containing coal tar, coal gas, alcohols, formaldehyde and ammonia, among others. Keeping the organic compounds without volatilizing, to allow new processes, uses and applications for the components, before dependent of distillation on the smoke to be used, such as methanol, produced by distillation of wood smoke.

EXAMPLES AND COMPARATIVE EXAMPLES

The invention is further explained by the following Examples. Example and Comparative Example 1: In Example 1, shows the heat exposure of a piece of paper, with use of the process of the present invention from a piece of sheet of plain paper, set to "material object", and added, incorporated, distributed and/or fixed to it a sulfuric acid content against the comparative example 1, where it gives exposure to heat a piece of plain paper sheet without application of the process. In both cases, the leaves are taken and subjected to horizontal continuous fire without wind, with the vertical edge of the flame touching her center. For example, if a common take-paper, 1 cm2 area, 0.1 mm in thickness, 75 g/m2 weight and 0.75 g/cm3 density, to which is added sulfuric acid, by aqueous, by allowing the sheet is soaked and permeated by sulfuric acid. The choice of plain ready paper sheet to which is added the amount of sulfuric acid for soaking is exemplary, since it allows more objective explanation of which can expand the concept and understanding for all other applications and devices to perform the process. The paper is exemplarily selected from other materials, it is what objectively is expected to be susceptible to heat and fire. The submersion is exemplary because it leads to the simplest ways of adding sulfuric acid, and consequently the simplest of devices. The addition of sulfuric acid to the material is exemplary because objectively shows a basic form of process execution, a device and a applicable matters, according to a sulfuric acid addition iteration, allowing the understanding of the appropriate amount of sulfuric acid to be present in final product, this iteration which could occur during the manufacture of the material, or as is the case for example, after it. The paper of the example, once having dried, will look similar to a sheet of plain paper. Subjected to heat or flame, with continuous exposure to flame, the material resists such that continues with firm density, with the same visual appearance for periods exceeding two-digit seconds, even for the very small thickness of the sheet of paper where to expect immediate visual effects. With the maintenance of continuous exposure to flame, the paper sheet piece becomes dark in a slow time scale, exclusively restricted to the area hit by the end of the flame, whose progression can easily be followed with the naked eye, gradually light gray black, covering the color scale in proportion to the time that the fire is applied on the surface, also for periods exceeding two digits of seconds. While insisting with the flame in the subjected to the process surface material, there is no horizontal spread of heat and even browning, with margin close to 0.1 mm. The material does not lose density, satisfactorily maintaining the quality of its fibers, and does not propagate fire, remain possible, after a long time of submission to the flame, verify that the material remains dense, including in the area touched by the flame, where density can to increase with increase of carbon content, that it could be broken, without volatilization or apparent ashes. In summary, submitted to continuous flame, even a small, thin and seemingly fragile piece of paper resists. The heat and flame does not radiate, do not propagate and therefore do not consume the material. Even some of the material touched by the flame resist, remaining dense, heat-resistant and smokeless. Taking contact with the flame to the limit, approaching the minute, there may be a marginal volatilization, beginning a string of less than 0.1 mm of smoke that rises straight in the air, from the center of of the material touched by flame. Testing to the limit the material for exposure to the flame, it follows that the material does not wrinkle, remains thick, and the limit of minutes, remains structure without crumble, so that, with the force applied on the area touched by the flame, this is broken. Even after dozens and dozens of seconds, the flame is not radiated to the part of untouched materials for the same, the same step that played part in the flame—and only that part—even attacked by fire, maintains its rigid structure, the point break under use of force. In the comparative example, exposure to heat and flame of a piece of equivalent measures of common sheet of paper, there would be immediate consumption of it by fire, releasing volatile and forming ash. Touch the tip of the flame in a common same size sheet of paper would be sufficient to initiate combustion, which radiate from the center to the edges, consuming the material, changing its structure, twisting it, wrinkling her, volatizing of the material and making only ashes remain in about 3 seconds.

Take a second example and comparative example. Example and Comparative Example 2: In Example 2, shows the exposure to heat a certain area subject to the spread of heat and fire by burning, in particular urban or forest, with employment process of the present invention, compared to the comparative example 2, where it gives exposure to heat an equivalent circumference without applying the process. In Example 2, an aqueous fluid provided with a sulfuric acid content of the present invention may be a vehicle while an efficient device in firefighting, replacing the water advantageously, released directly on the material affected by the heat, released to the along a perimeter to be protected, where materials have not yet been affected by heat, or triggered by hydrants and sprinklers. This is because, unlike water, drying with heat, which then consume the material, the fluid of the present invention prevents fire from spreading by the materials whether they are already being consumed by heat or within a perimeter at which the fluid It has been released, by which heat will not pass, even if it dry its liquid part or that its liquid part has already volatilized naturally. The fluid resistance provided by the present invention protects the material, even if the fire dry it, avoiding the consumption of materials and the spread of heat and fire. In addition, the same fluid as the final product may be applied to the perimeter subjected to fire, urban, rural or forestry as well as in its vertical section (vertical part of the materials, constructions and situated forests on the perimeter), preventing the spread of heat and fire by land and air, even in the volatilization hypothesis of its liquid part. This gives a logistical and economic advantage, since it is not necessary to carry a significant amount of water or throw water on all materials, just circling the perimeter and its vertical section, if any, or the hot spots with the fluid because the heat and the fire will not pass the defined area, are extinguished without spreading, for lack of fuel. In comparative example 2, the water thrown on fires, urban or forest, has a lower efficiency, since it requires transporting a significant volume of water, its launch to take on all materials and their vertical sections and the amount is enough to extinguish the heat, either by sprinklers, water trucks or airplanes, which becomes complex in large fires, especially in the case of forest fires, where fire spreads through the soil and air, by dry vegetation.

Finally, the present invention also concerns products resulting from the process according to the present invention and its use (including as a device). Among the created and resulting elements from process, which are object of the present invention as well as their use, are described below those that, without prejudice to other elements that can be created and result of the present invention (since the process of present invention achieves any material or known material science), the following products and uses are made:

PRODUCT for resistance or material transformation resulting from the process, including subject, body, fluid, product, substance or material, physical and biological, organic or not, existing or in production, whatever it is, fuel, oxidizer or not, hydrophobic, hydrophilic or not, homogeneous or not, dense, hollow, laminated or not, isotropic or not, solid, liquid or gaseous, characterized by comprising a sulfuric acid content added, embedded, distributed and/or fixed, preferably at their composition, any of its inputs, phases, layers, interior or surface. There is possibility of further comprise an equivalent content of acetic acid.

PRODUCT characterized by preferably comprise preferred composition by weight from 0 to 99.9999% of "material object", any of its inputs, phases, layers, or surface, from 0.0001 to 99.9999% of sulfuric acid, from 0 to 99 9999% of vehicle, from 0 to 20% of sealant agent, 0 to 20% of insulating agent, 0 to 20% of plasticizer modulating agent, 0 to 20% of waterproofing and from 0 to 99.9999% of other vehicles, elements, excipients or known in the art.

PRODUCT characterized by the possibility of sealant, insulation, waterproofing, or plasticizer layer between its inputs, phases, layers and/or surface.

PRODUCT characterized by comprising, more preferably, matter, body, fluid, substance or material with distribution and amount of sulfuric acid proportionate to that derive from permeation or mixture of matter, body fluid, substance or material, any of its inputs, phases, layers, interior or surface by sulfuric acid diluted in water preferably at a concentration of 1 to 10% (sulfuric acid water), and thereafter, drying the matter, body, fluid, substance or material, any of its inputs, phases, layers, interior or surface (drying where applicable or desirable).

Product characterized by comprising, most preferably, a sulfuric acid content added, embedded, distributed and/or fixed at the weight preferably equivalent at 1/1000 to 1/10 of the weight of a drop (depending on whether it was concentrated in water from 0.1 to 10%) to matter, body, fluid, substance or reference material with 0.75 g/cm3 density, 64 to 100 mm2 (1 cm2) area and 0.1 mm thick, whose composition, resulting from the addition, incorporation and distribution of sulfuric acid preferably by aqueous medium, may include matter, body or fluid, substance or "material object", its composition, any of its inputs, phases, layers, interior or surface and sulfuric acid.

PRODUCT comprising a gift sulfuric acid content in the composition of matter, body or fluid, substance or material can be one equivalent (and proportional) to the addition of 10 mm3 (or 1 drop) of concentrated sulfuric acid in 1 water 10% (thereby giving added sulfuric acid, embedded, distributed and/or fixed on the equivalent weight preferably from 1/100 to 1/10 the weight of a drop) for each 6.4 to 10 mm3 (1 cm2 by 0.1 mm thick) of a substance, or body fluid, substance or final material reference weight, density and volume corresponding to 75 g/cm2, 0.75 g/cm3 and 64 to 100 mm2 area of 0.1 mm thick, and subsequent drying of the material, or body fluid, substance, or material (this applies or desirable case). If the material is fluid or an aqueous slurry, can you only the addition sulfuric acid, preferably at the content of 1 10%.

PRODUCT characterized by being configured as a carrier, device and/or final product. This is because any material, body fluid product, substance or material resulting from the process and the present invention can be constituted as a vehicle for incorporation of the sulfuric acid content to a material other like device for embedding the sulfuric acid content to a other materials after a certain event or other building materials to which you lend strength properties or as a final product, where it matters acquired resistance itself (with end in itself). In particular, you can adjust the geared up for each function, among the different possible compositions of "material object", sulfuric acid and vehicle: in the case of a device, the composition will have a higher share of sulfuric acid (with 'material object" and the vehicle may tend to zero) in the case of vehicle, the composition will have a higher share of vehicle (with "material object" may tend to zero) in the case of "material object", the composition will have a stake most object material. In the case of the configuration and use of the invention as a carrier, which is enhances the ability of the sulfuric acid concentration, preferably in an aqueous medium can reach any element existing in nature, constructed or manufactured. In the case of the embodiment of the invention as a device, which highlights is its ability of being near or integrated into a matter or material, can serve as the basis for delivery of the same resistance constitution.

PRODUCT characterized by additionally significant presence of carbon, volatile and derivatives resulting from exposure to temperature and pressure variation, preferably (particularly) the heating.

PRODUCT characterized in that, additionally, the "material object" being biomass, perimeter, ground, forest, soil, building or substrate.

PRODUCT characterized in that, additionally, the "material object" being organic material, preferably cellulosic material (wood, stems, branches, leaves, pulp, fiber, paper pulp, paper pulp, cellulose pulp, cellulose gum, wood pulp, paper pulp, paper, fiber, powder, bran, wood chips, bark or vegetable chips, among others). If the material is fluid or aqueous, slurry may be added to incorporate and distribute it only sulfuric acid, preferably at the content of 1 10%.

PRODUCT characterized in that, additionally, the "material object" to be mineral, rock, sand, soil and clay.

PRODUCT characterized in that, additionally, the "material object" to be constructive element, waterproofing or paving.

PRODUCT characterized in that, additionally, the "material object" is fiber, preferably fiber plant in nature, natural or processed, including al vegetable fiber (hydrated or dehydrated) or vegetable waste, leaves, branches, and plant stems and their derivatives.

PRODUCT characterized in that, additionally, the "material object" to be fiber, fiber preferably animal, more preferably animal wool and yarn.

PRODUCT characterized in that, additionally, the "material object" to be mineral, synthetic or mixed fibers, preferably composed of cotton and polyester fiber.

PRODUCT characterized in that, additionally, the "material object" to be wire, fiber preferably of animal origin, vegetable or synthetic fabric, mesh, fabric, felt, mat or layer.

PRODUCT characterized in that, additionally, the "material object" is fluid, preferably liquid, gel polymer or, more preferably, in the case of liquid water and in the case of polymer, plastic, foam and rubber.

PRODUCT characterized in that, additionally, the "material object" being binder, wax, body or texture.

PRODUCT characterized in that additionally, the "material object" is foam polymer or preferably not animal, vegetable, mineral or synthetic origin, preferably of polyurethane or latex, more preferably, foam block, industrial or otherwise, with a density of 0.5 to 100 kg/m3.

PRODUCT characterized in that, additionally, the "material object" resin preferably be of animal, vegetable, mineral or synthetic origin.

PRODUCT characterized in that, additionally, the "material object" emulsion is preferably latex.

PRODUCT characterized in that, additionally, the "material object" is, preferably, capsule, pouch, membrane, filter or touch, more preferably, with application as a device, a pouch, capsule or membrane made from existing materials in the prior art, involving sulfuric acid in aqueous medium and it can be ruptured by pressure or heat over the same. This capsule can preferably be released, be near, or integrated implanted in the material that will provide resistance after firing (e.g., embedded), integrating the same by gravity or breaking the capsule, pouch, membrane, filter or touch with displacement vehicle equipped with sulfuric acid content (natural or induced). Preferably, setting up for the pressure or heat burst the bag, capsule or membrane, allowing the sulfuric acid in an aqueous medium to integrate the material that you want to provide resistance. Its border, once broken, allows the release, or scatter contact with the vehicle consisting resistance over or within a third material, now giving this resistor. This is a preferred application in the sense of setting up pouches, capsules or membranes having therein material produced with the strength characteristics of the present invention and which can be integrated, for example, by launching or graft to a second material. Each pouch, capsule or membrane would serve as micro-resistant barrier over the second material with the advantage that, depending on the choice of material for the capsule shell become possible to build or not rupturable capsules. In the case of rupturable capsules which may also be launched, it provides that, on its rupture, the present in its interior material (which may be liquid state) to spread the second material and lend it the strength properties. Another preferred embodiment of the present invention as a device consists of the material pouch, capsule or membrane, instead of rupturable by pressure or heat, to be rupturable by water (water-soluble). Thus, sulfuric acid (or sulfuric acid mixed material or the nonaqueous solvent), within the pouch, capsule or membrane, is released once the pouch, capsule or membrane into contact with water caused or not. This contact would release sulfuric acid and also allow him to come into direct contact with the material to be provided with resistance after shooting, using as a vehicle the water itself that broke the bag, capsule or membrane.

PRODUCT characterized in that, additionally, the "material object," be a vehicle other than water (such as gel mixture, preferably aqueous, rock, sand, earth and/or clay, dust and other solvents, among others).

PRODUCT characterized in that, additionally, the "material object" being carbon structure, in its various forms and combinations, spontaneous or provoked, either for the allotropic (as amorphous and crystalline carbon, graphite, diamond, fullerene, and nonotubos), combinations chemicals which derive, for example, carbon dioxide, carbon monoxide and carbonate rocks (combination with oxygen), hydrocarbons (combined with hydrogen), to fatty acids, esters (combination with oxygen and hydrogen), the carbides and acetylides (combination with metals), among others.

PRODUCT wherein additionally the "material object" to be oil, gas and other hydrocarbons, as well as the deposited materials that give rise to them. In the case of oil to claim applies the same understood in a wider sense, from complex mixtures and solid hydrocarbons variables, liquid and gaseous, in the narrower sense, liquid hydrocarbon, liquid rock, fuel, fossil or hydrocarbons natural, chemical compounds composed exclusively of carbon and hydrogen atoms. It also applies to hydrocarbons in general, whether gas (methane, ethane, propane, butane, among others), solid (bitumen/asphalt/tar, waste, exterior insulation, synthetic and paraffin fibers, among others), liquids (oil crude oil and oil products: petrol, diesel, lubricating oil, medicinal oil, queresone, fuel, paints, among others), among others.

PRODUCT wherein additionally the "material object" being coal, peat (incomplete incarbonização), lignite, coal, anthracite, among others.

PRODUCT wherein additionally the "material object" to be volatile compounds associated with the carbon structure and its transformations is replaced also interested in all processes that involve heating to release volatile, especially coal, charcoal, coke, oil, gas and other hydrocarbons, either by changing the point of release, either by keeping them free release of smoke available for other types of alternative processing, such as, for example, coke, heated coal in the absence of oxygen to eliminate organic compounds, whose fumes produced by the process becomes valuable, containing coal tar, coal gas, alcohols, formaldehyde and ammonia, among others.

Using the products of the present invention characterized in that the preparation of the strength of materials (physical, chemical and biological) temperature and pressure variations (natural, accidental or controlled) to heat and fire, to contagion, creation, consumption and propagation such as the degradation of materials, combustion, the pyrofagia, the volatilization, the emission of gases, the release of carbon, the spark and the explosion, as well as in the preparation of the controlled synthesis of structures, increase of carbon content and term impressions, preferably submitted the materials of temperature and pressure variations.

Use of products of this invention characterized in that the preparation or use the subject, body fluid product, substance or material to be formed, endowed with resistance or transformed by the present invention, whatever it is, physical or biological, organic or inorganic, fuel, oxidizer or nonhydrophobic, hydrophilic or not, or not smooth, dense, hollow, laminated or not, solid, liquid or gaseous.

Using the present invention product characterized in that the preparation or job preferably (particularly) biomass perimeter land, forest, soil, substrate or building, organic material cellulose (wood, stems, branches, leaves, pulp, fiber, pulp, paper pulp, cellulose pulp, cellulose gum, wood pulp, paper pulp, paper, fiber, powder, bran, wood chips, bark or vegetable chips, among others), mineral, rock, sand, earth and clay, construction element, waterproofing or paving, vegetable fiber, animal, mineral, synthetic or mixed yarn, fabric, mesh, fabric, felt, blanket or layer, fluid, fluids, polymers, gel, paste, wax, mass or texture, foam, resin, emulsion, capsule, pouch, membrane, filter, touch, carrier, as well as the inputs, steps, layers, interiors or surfaces of these and any other materials, organic or inorganic, such as stems, branches, leaves and debris vegetables, even though dried, or dehydrated degradation.

Use of the products of this invention characterized in that in preparation or use as vehicle, device and/or final product for resistance or processing equipment. This is because any material, body fluid product, substance or material resulting from the process and the present invention can serve as the vehicle for incorporation of the sulfuric acid content to a material other like device for embedding the sulfuric acid content to a material other after a certain event or other building materials to which you lend strength properties or as a final product, where it matters acquired resistance itself (with end in itself). In particular, you can adjust the geared up for each function, among the different possible compositions of "material object", sulfuric acid and vehicle: in the case of a device, the composition will have a higher share of sulfuric acid (with 'material object" and the vehicle may tend to zero) in the case of vehicle, the composition will have a higher share of vehicle (with "material object" may tend to zero) in the case of "material object", the composition will have a stake most object material. In the case of the configuration and use of the invention as a carrier, which is enhances the ability of the sulfuric acid concentration, preferably in an aqueous medium can reach any element existing in nature, constructed or manufactured. In the case of the embodiment of the invention as a device, which highlights is its ability of being near or integrated into a matter or material, can serve as the basis for delivery of the same resistance constitution.

Using the present invention product characterized in that the preparation or use as a vehicle while the device in the fight against heat and fire, preferably fluid endowed with resistance by the present invention to use triggered by trigger mechanism, preferably sprinklers, substituting water advantage. The water from the sprinklers, even if wet fire to subject materials can also be consumed by fire, not by avoiding materials consumption. The fluid resistance provided by the present invention protects the material, even if the fire dry, avoiding the consumption of materials and the spread of heat and fire.

USE the products of the present invention characterized by being in the preparation or use as a final product, preferably applied in perimeter subject to fire, urban, rural or forestry, as well as its vertical section, preventing the spread of heat and fire by land and air, even in the volatilization hypothesis of its liquid part.

USE the products of the present invention characterized by being in the preparation, employment or application to reduce the emission of greenhouse gases.

USE the products of the present invention characterized by being in the preparation, use or application for increase carbon content of coal, oil, natural gas and other hydrocarbons.

Use of products of this invention characterized by being in the preparation, use or application in the various steps of the training process of various kinds of carbon structure, shapes and combinations spontaneous or provoked with industrial applicability, regardless particularly the steps involving setting reducer, anaerobic (low oxygen or need to prevent oxidation), thermodynamic processes (pressure and temperature variations), biochemical processes (increased density and volatile loss) and duration.

Use of products of this invention, characterized in that the preparation, use or application in the formation of carbon structures, coal, oil, gas and other hydrocarbons, considering in particular the physical properties of coals (color, density, shine, hardness) and chemical (calorific value, percentage carbon, volatile and water), enabling the use of the present invention to obtain similar to coal structures, turf (incomplete incarbonization), lignite, coal, anthracite (large calorific value but difficult to combustion), among others, being that, in the case of oil, is applied to the same understood formation process or in the broader sense of complex mixtures and solid hydrocarbons variables, liquid and gaseous, in order narrower, liquid hydrocarbon, liquid rock, fuel, fossil or natural hydrocarbons composed chemicals solely of carbon and hydrogen atoms and also hydrocarbons in general, whether they be gaseous (methane, ethane, propane, butane, among others), solid (bitumen/asphalt/tar, waste, exterior insulation, synthetic and paraffin fibers, among others), liquids (crude oil, oil and oil products: petrol, diesel, lubricating oil, medicinal oil, kerosene, fuel oil and paints, among others), among others.

Use of products of this invention, characterized in that the preparation, use or application of the various stages of carbon formation, coal and hydrocarbons, especially understood as the accumulation of organic matter and inorganic sediment deficient oxygen environments (where the subject organic, although preserved from oxidation, undergoes changes resulting from inorganic chemical reactions and the action of bacteria), bitumen (anaerobic decomposition of organic matter), kerogen formation (rich material very heavy solid hydrocarbons with organic macromolecules resulting from the breakdown of lipids, carbohydrates and proptides of decaying organisms, whose resultant formation of the previous steps is the generation of a gas and the transformation of the remaining organic matter into kerogen), and "windows" of carbon, coal, oil (temperature between 50 and 150° C. and depth between 1500 and 4500 m), gas (when the temperature exceeds 150° C., fails to form oil and begins to form natural gas) and other hydrocarbons.

Use of products of this invention, characterized in that the preparation, use and application in obtaining natural process or caused various materials and products derived from carbon in its different structures, shapes and combinations with economic interest, energy, logistical and commercial, fulfilling conditions for incarbonization and the formation of hydrocarbons and that being or not and generating reservoir chambers, have resulted in the formation of materials enriched with carbon without necessarily mean the loss of volatiles.

Use of products of this invention, characterized in that the preparation, use or application steps of manufacturing/creation of multiple "subject materials," when also can take advantage of existing mechanisms in the steps of manufacturing/constitution of the "material object", whether industrial or natural, in particular cellulose, paper, wood, plastics, foams, rubber, fabrics and mineral derivatives.

Use of products of this invention, characterized in that the preparation, use or application in reducing materials or material recycling.

Use of products of this invention, characterized in that the preparation, use and application of the distillation volatiles, such as methanol, produced by distillation of wood smoke.

The invention claimed is:

1. A process for rendering a material thermally resistant comprising:

providing a mixture comprising sulfuric acid diluted in water, the sulfuric acid at a concentration between 0.1% and 10% by weight; and contacting the material with the mixture to thereby render the material thermally resistant, wherein 0.05 grams of sulfuric acid at a concentration between 0.1% and 10% by weight is contacted with the material for each 0.075 grams of the material being rendered thermally resistant.

2. The process according to claim 1, wherein the material is an organic material or a liquid.

3. The process according to claim 1, wherein the material is paper, paint, a textile, or a plastic.

4. The process according to claim 3, wherein the material is paper, the mixture is an aqueous solution, and the paper is contacted with the mixture until the aqueous solution permeates the paper.

5. The process according to claim 4, further comprising drying the paper after permeating the paper with the aqueous solution.

6. The process according to claim 1, wherein the material is a finished product.

7. The process according to claim 1, wherein the process is carried out during manufacture of a product.

8. The process according to claim 1, further comprising adding a layer of protective coating to the material after contacting with the mixture.

9. The process according to claim 8, wherein the protective coating is a sealant, an insulator, a modulating agent, a wax, or a waterproofing agent.

10. The process according to claim 1, further comprising, after contacting with the mixture, exposing the material to changes in temperature and pressure.

11. The process according to claim 10, wherein the temperature changes are between 0° and 800° C. and the pressure changes are at pressures equal to or greater than 20,000 ATM.

12. The process according to claim 1, wherein the material is rendered resistant to fire.

13. A process for rendering a material thermally resistant comprising: contacting the material with a mixture that includes a carrier and a flame retardant, the flame retardant consisting of sulfuric add, the sulfuric add at a concentration between 0.1% and 10% by weight, wherein 0.05 grams of sulfuric add at a concentration between 0.1% and 10% by weight, diluted in the carrier, is contacted with the material for each 0.075 grams of the material being rendered thermally resistant.

14. The process according to claim 13, wherein the material is paper, paint, a textile, or a plastic.

15. The process according to claim 14, wherein the material is paper, the mixture is an aqueous solution, and the paper is contacted with the mixture until the aqueous solution permeates the paper.

16. The process according to claim 14, wherein the carrier is water.

17. The process according to claim 13, wherein the material is a finished product.

18. The process according to claim 13, wherein the process is carried out during manufacture of a product.

19. The process according to claim 13, further comprising adding a layer of protective coating to the material after contacting with the mixture.

20. The process according to claim 19, wherein the protective coating is a sealant, an insulator, a modulating agent, a wax, or a waterproofing agent.

* * * * *